United States Patent
Palacios

(10) Patent No.: US 8,616,327 B1
(45) Date of Patent: Dec. 31, 2013

(54) PORTABLE MEDIA PLAYER SOUND DEFLECTING ASSEMBLY

(76) Inventor: Raul Palacios, Apopka, FL (US)

( * ) Notice: Subject to any disclaimer, the term of this patent is extended or adjusted under 35 U.S.C. 154(b) by 64 days.

(21) Appl. No.: 13/290,793

(22) Filed: Nov. 7, 2011

(51) Int. Cl.
| | | |
|---|---|---|
| G10K 11/00 | (2006.01) | |
| A47F 5/00 | (2006.01) | |
| F16M 11/04 | (2006.01) | |
| H04M 1/00 | (2006.01) | |

(52) U.S. Cl.
USPC ....... 181/175; 181/211; D14/172; D14/238.1; D14/253; D14/496; 248/176.3; 248/309.1; 379/446; 455/569.1; 455/575.1; 710/303

(58) Field of Classification Search
USPC ............ 181/175; D14/238.1, 253; 248/309.1; 379/446; 455/569.1; 710/303
See application file for complete search history.

(56) References Cited

U.S. PATENT DOCUMENTS

| | | | | |
|---|---|---|---|---|
| D323,085 S | * | 1/1992 | Konkel | D6/466 |
| 5,295,649 A | * | 3/1994 | Lee | 248/205.2 |
| 5,305,381 A | * | 4/1994 | Wang et al. | 379/455 |
| D356,074 S | * | 3/1995 | Coblentz et al. | D14/457 |
| D360,210 S | * | 7/1995 | Rudkiewicz et al. | D14/253 |
| 5,480,115 A | * | 1/1996 | Haltof | 248/221.11 |
| 5,828,750 A | * | 10/1998 | Perala | 379/446 |
| 5,839,919 A | * | 11/1998 | Chen | 439/529 |
| 5,996,956 A | * | 12/1999 | Shawver | 248/309.1 |
| 6,185,302 B1 | * | 2/2001 | Rytkonen et al. | 379/446 |
| D452,236 S | * | 12/2001 | Kohli | D14/253 |
| 6,341,218 B1 | * | 1/2002 | Poplawsky et al. | 455/569.1 |
| 6,738,477 B1 | * | 5/2004 | Kam | 379/446 |
| 6,762,585 B2 | * | 7/2004 | Liao | 320/107 |
| 6,848,662 B2 | * | 2/2005 | Paramonoff et al. | 248/309.1 |
| 6,980,836 B1 | * | 12/2005 | Skiles | 455/569.2 |
| D530,713 S | * | 10/2006 | Richter | D14/253 |
| D531,618 S | * | 11/2006 | Kennemer et al. | D14/238.1 |
| D535,988 S | * | 1/2007 | Kettula et al. | D14/253 |
| 7,273,199 B2 | * | 9/2007 | Piekarz | 248/220.22 |
| D590,184 S | * | 4/2009 | Barabas et al. | D6/466 |
| 7,738,241 B2 | * | 6/2010 | Hsieh et al. | 361/679.1 |
| 7,780,137 B2 | * | 8/2010 | Hansel et al. | 248/346.01 |
| 7,818,035 B2 | * | 10/2010 | Bury | 455/575.1 |
| D627,771 S | * | 11/2010 | Smith et al. | D14/253 |
| 7,920,905 B2 | * | 4/2011 | Bury | 455/575.1 |
| 8,061,516 B2 | * | 11/2011 | Carnevali | 206/320 |
| 8,240,628 B2 | * | 8/2012 | Huang | 248/316.1 |
| D671,544 S | * | 11/2012 | Chun et al. | D14/447 |
| 8,317,067 B2 | * | 11/2012 | Lewis | 224/183 |
| D681,612 S | * | 5/2013 | Palacios | D14/238.1 |
| 2003/0221876 A1 | * | 12/2003 | Doczy et al. | 178/18.01 |
| 2006/0058070 A1 | * | 3/2006 | Chang | 455/569.1 |
| 2007/0087725 A1 | * | 4/2007 | Anderson | 455/348 |
| 2007/0099681 A1 | * | 5/2007 | Kielland | 455/575.1 |
| 2007/0288678 A1 | * | 12/2007 | Langberg et al. | 710/303 |
| 2008/0019082 A1 | * | 1/2008 | Krieger et al. | 361/679 |
| 2009/0292851 A1 | * | 11/2009 | Mead et al. | 710/303 |
| 2010/0072334 A1 | * | 3/2010 | Le Gette et al. | 248/176.3 |
| 2011/0031287 A1 | * | 2/2011 | Le Gette et al. | 224/101 |

* cited by examiner

*Primary Examiner* — David Warren
*Assistant Examiner* — Christina Russell

(57) ABSTRACT

A portable media player sound deflecting assembly includes a panel that has a front side, a back side, a first edge, a second edge, a bottom edge and an upper edge. A first lateral flange is attached to the first edge. The first lateral flange has a first side abutting the front side. The first lateral flange is angled forward of the front side such that an obtuse angle is formed with the front side and the first lateral edge. The first lateral edge deflects sound from a personal sound emitting apparatus forward of the panel when the personal sound emitting apparatus is positioned on the front side.

11 Claims, 5 Drawing Sheets

PORTABLE MEDIA PLAYER SOUND DEFLECTING ASSEMBLY

BACKGROUND OF THE DISCLOSURE

Field of the Disclosure

The disclosure relates to sound deflecting devices and more particularly pertains to a new sound deflecting device for causing the sound emitted from a personal media player to be directed forward of the player.

SUMMARY OF THE DISCLOSURE

An embodiment of the disclosure meets the needs presented above by generally comprising a panel that has a front side, a back side, a first edge, a second edge, a bottom edge and an upper edge. A first lateral flange is attached to the first edge. The first lateral flange has a first side abutting the front side. The first lateral flange is angled forward of the front side such that an obtuse angle is formed with the front side and the first lateral edge. The first lateral edge is configured to deflect sound from a personal sound emitting apparatus forward of the panel when the personal sound emitting apparatus is positioned on the front side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
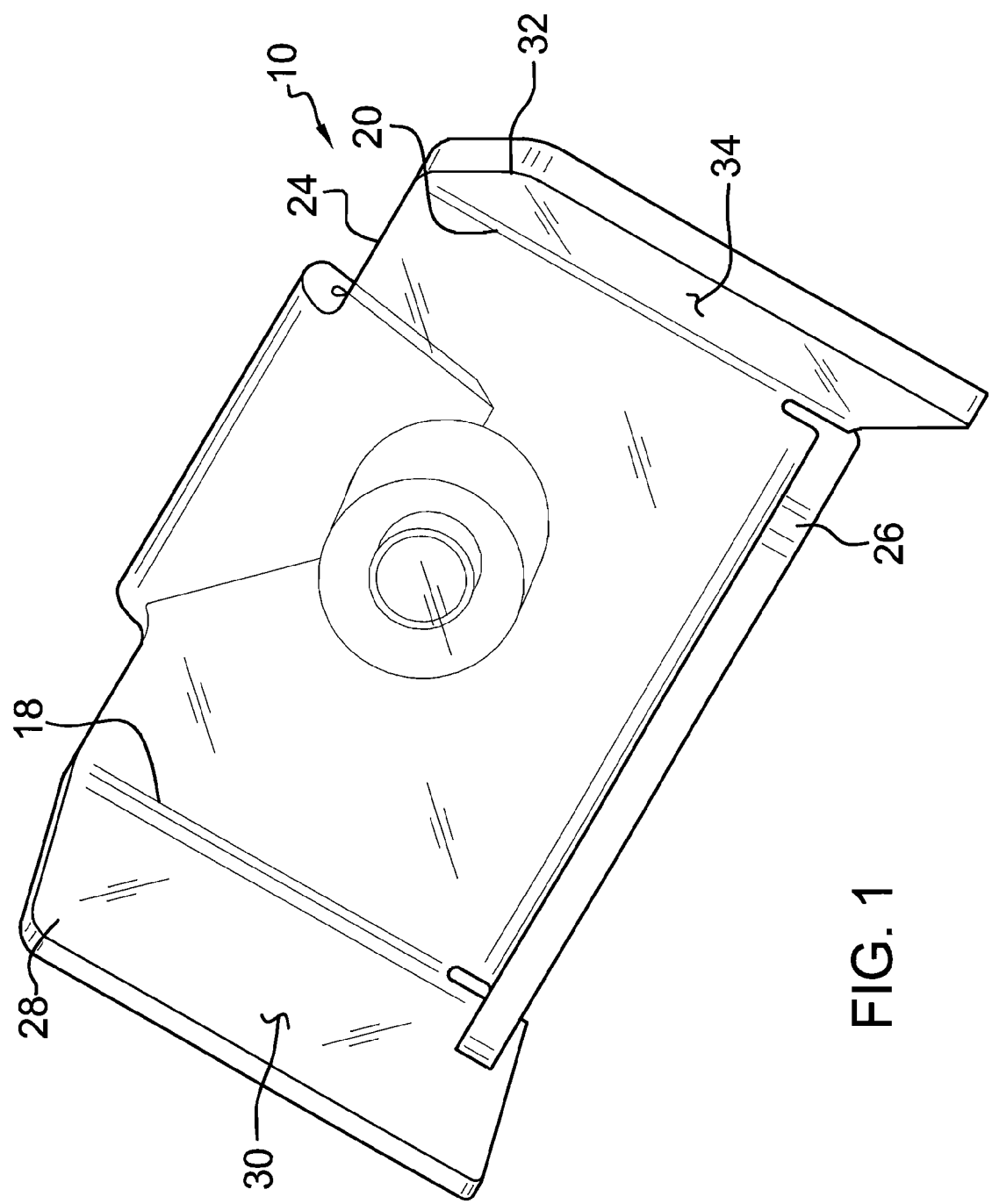
FIG. 1 is a front perspective view of a portable media player sound deflecting assembly according to an embodiment of the disclosure.
Figure 2:
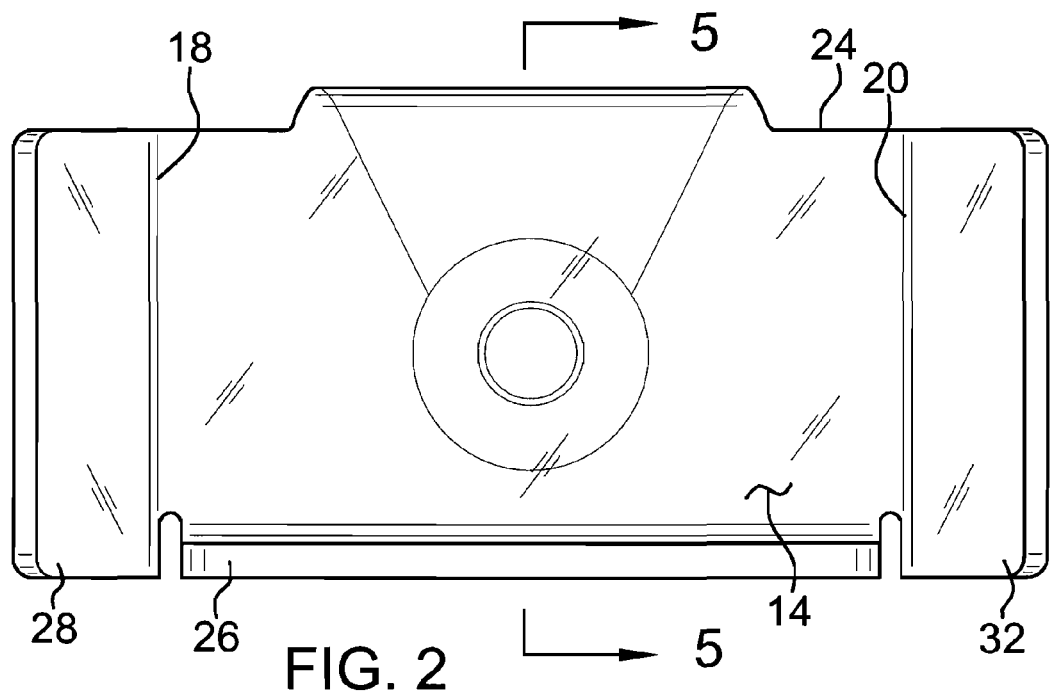
FIG. 2 is a front view of an embodiment of the disclosure.
Figure 3:
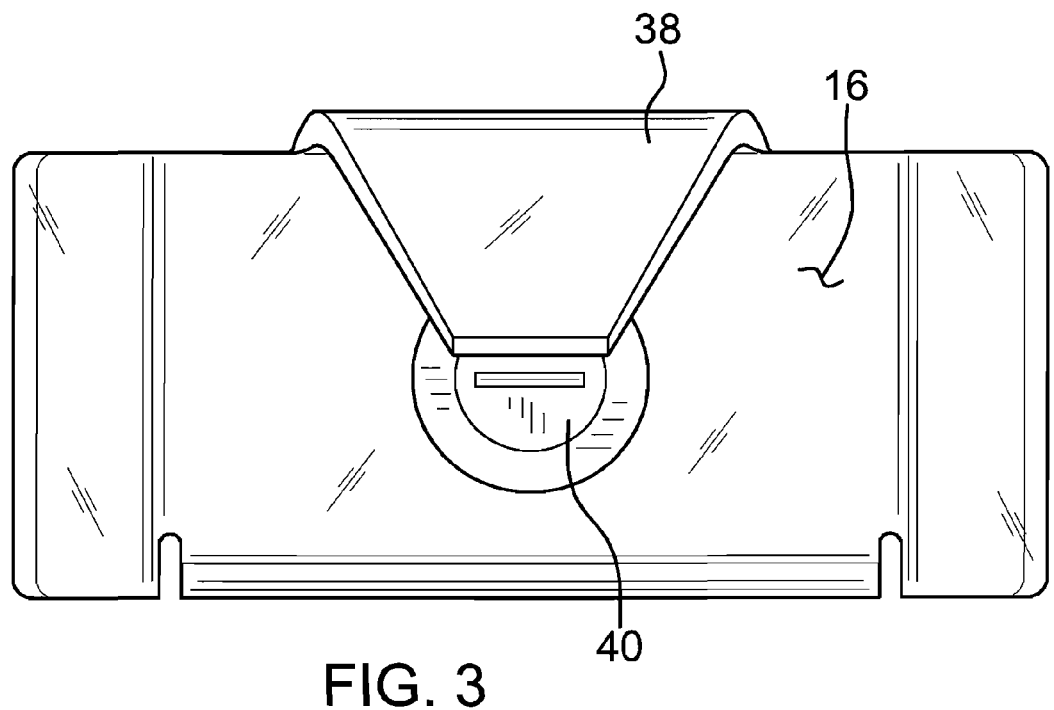
FIG. 3 is a rear view of an embodiment of the disclosure.
Figure 4:
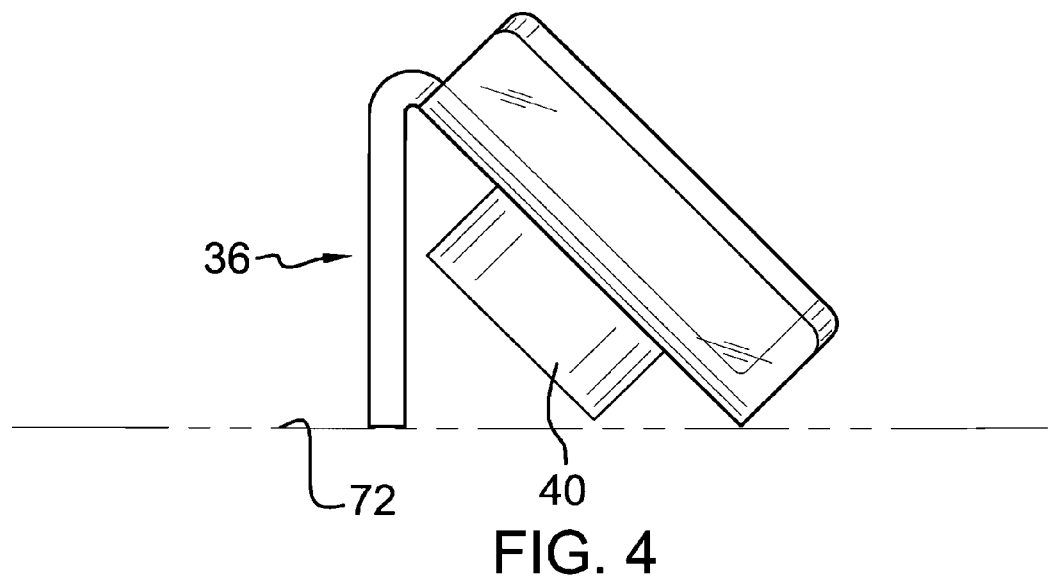
FIG. 4 is a side view of an embodiment of the disclosure.
Figure 5:
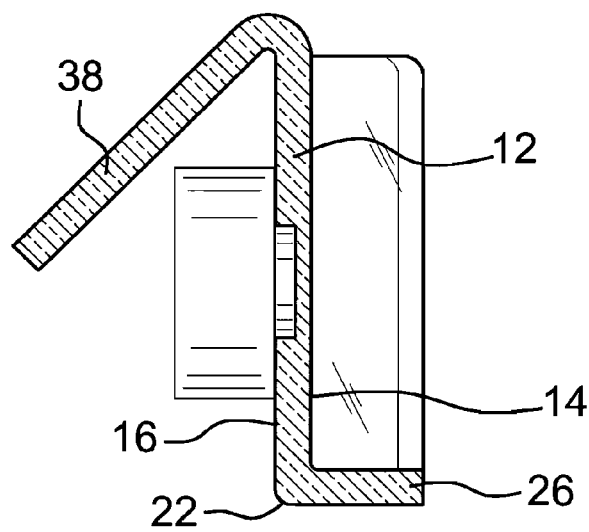
FIG. 5 is a cross-sectional view of an embodiment of the disclosure taken along line 5-5 of FIG. 2.
Figure 6:
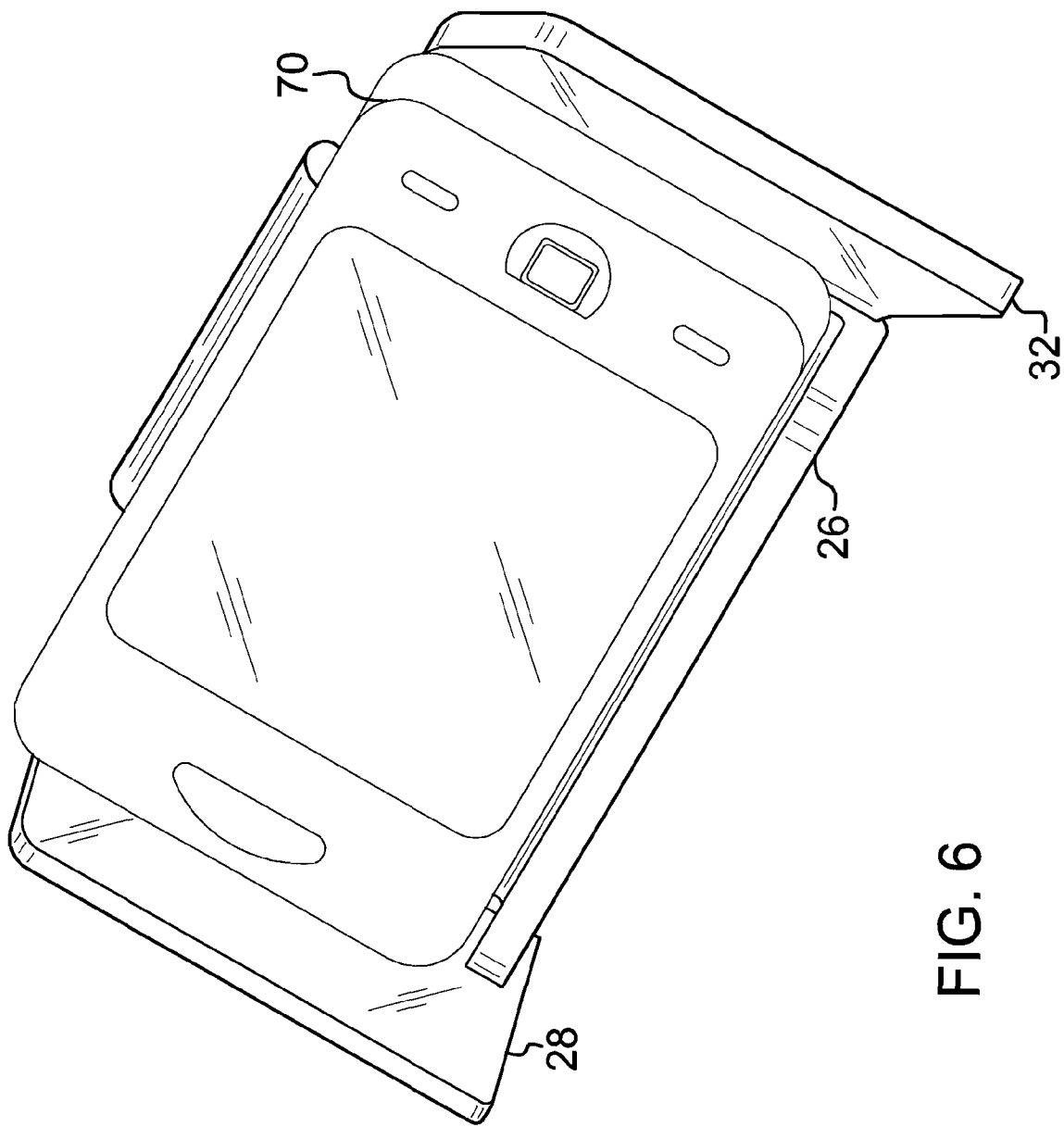
FIG. 6 is an in-use perspective view of an embodiment of the disclosure.

With reference now to the drawings, and in particular to FIGS. 1 through 7 thereof, a new sound deflecting device embodying the principles and concepts of an embodiment of the disclosure and generally designated by the reference numeral 10 will be described.

As best illustrated in FIGS. 1 through 7, the portable media player sound deflecting assembly 10 generally comprises a panel 12 that has a front side 14, a back side 16, a first edge 18, a second edge 20, a bottom edge 22 and an upper edge 24. The panel 12 may have a length from the first edge 18 to the second edge 20 between 5.0 cm and 28.0 cm and the panel 12 may have a height from the upper edge 24 to the bottom edge 22 between 5.0 cm and 28.0 cm. More particularly, the panel, 12 may have a shape depending on the type of a portable media player 70 being used. As such the panel 12 may have a length between 10.0 cm and 14.0 cm and a height between 5.0 cm and 7.0 cm for smaller devices such as cellular phones and devices of similar size. The panel 12 may also have a length between 20.0 cm and 28.0 cm and a height between 18.0 cm and 22.0 cm for notepad computer type devices and the like.

A lip 26 is attached to the front side 18 adjacent to the bottom edge 22 and extends forward therefrom. The lip 26 is configured to receive a personal sound emitting apparatus 70, or portable media player, of the type discussed above. The lip 26 extends outwardly away from the panel 12 a distance less than 3.0 cm. The lip 26 and the front side 18 form an angle between 80° and 120°.

A first lateral flange 28 is attached to the first edge 18 and has a first side 30 abutting the front side 14. The first lateral flange 28 is angled forward of the front side 14 such that an obtuse angle is formed with the front side 14 and the first lateral flange 28. A second lateral flange 32 is attached to the second edge 20 and also has a first side 34 abutting the front side 14. The second lateral flange 32 is angled forward of the front side 14 such that an obtuse angle is formed with the front side 14 and the second lateral flange 32. The first 28 and second 32 lateral flanges each extend away from the panel 12 a distance less than 5.0 cm. The first sides 30, 34 of the first 28 and second 32 lateral flange may be concavely arcuate. The first 28 and second 32 lateral flanges are configured to deflect sound forward of the panel 12 when the personal sound emitting apparatus 70 is positioned on the front side 14.

A support 36 is attached to the 12 panel and retains the panel 12 in an angled position with respect to a support surface 72, which may be a tabletop or any other conventional support surface, such that an angle formed with the support surface 72 is an acute angle. The acute angle may be between 30° and 80°. The support 36 may comprise a plate 38 that is attached to the panel 12 and is angled downwardly from the top edge 24 and outwardly from the back side 16. The panel 12, lip 26, support 36, first lateral flange 28 and second lateral flange 32 may each be formed from a single piece of material and be non-removably attached to each other.

The panel 12, lip 26, first lateral flange 28, second lateral flange 30 and support 36 may each be comprised of a translucent material which may or may not be a transparent material. The translucent material may also be colored or tinted. A conventional light emitter 40 may be attached to the back side 16. The light emitter 40 is turned on to emit a light to illuminate distal edges of the first 28 and second 32 lateral flanges with respect to the panel. The light emitter 40 may also illuminate the upper edge 24 and outer edges of the lip 26 by the light traveling through the translucent material.

Figure 7:
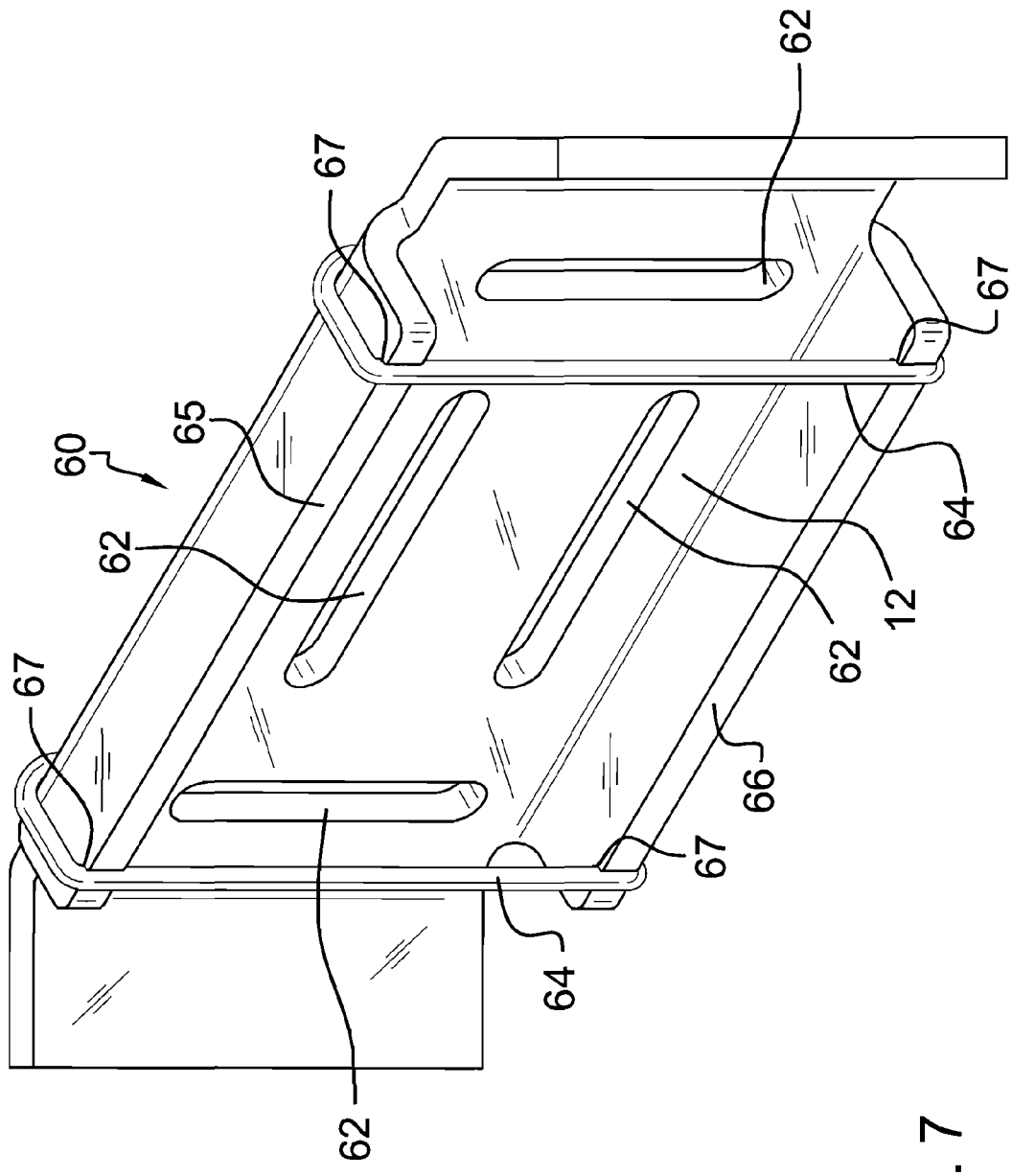
FIG. 7 is a front perspective view of an embodiment of the disclosure.

FIG. 7 depicts an assembly 60 having no support but with a panel 12 having slots 62 extending therethrough. The slots 62 may be used for receiving a strap for attaching the assembly to an object. Additionally, straps, tethers or resiliently stretchable bands 64 may be extended around the assembly 60 to retain the personal sound emitting apparatus 70 on the panel 12. An upper lip 65 may be attached to the panel 12 and used in combination with a lower lip 66 for extending over opposite edges the personal sound emitting apparatus 70. The upper 65 and lower 66 lips may include notches 67 for receiving the bands 64.

In use, the personal sound emitting apparatus 70 is positioned on the panel 12. Such apparatuses 70 typically include laterally positioned speakers or rearwardly positioned speakers that are adjacent to a perimeter edge of the apparatus 70. This positioning causes the sound to flow outwardly from the perimeter of the apparatus. The first 28 and second 32 lateral flanges direct the sound forward of the apparatus 70 so that the sound is more easily heard by a user of the apparatus 70. It should also be understood that the first 28 and/or second 32 flanges may be used for deflecting sound from in front of the apparatus 70 rearward of the apparatus 70 so that it may be received by a microphone on apparatus 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A sound deflection assembly configured for receiving a sound emitter and reflecting sound therefrom forward of the sound emitter, said assembly comprising:
    a panel having a front side, a back side, a first edge, a second edge, a bottom edge and an upper edge;
    a first lateral flange being attached to said first edge, said first lateral flange having a first side abutting said front side, said first lateral flange being angled forward of said front side such that an obtuse angle is formed with said front side and said first lateral flange, wherein said first lateral flange is configured to deflect sound forward of said panel when a personal sound emitting apparatus is positioned on said front side, said first lateral flange and said panel being of unitary structure such that said first lateral flange is fixed with respect to said panel;
    said panel having a length from said first edge to said second edge and height from said upper edge to said bottom edge, said length being greater than said height;
    a second lateral flange being attached to said second edge and extending forward of said front side, an angle formed by said first lateral flange and said front side being an obtuse angle, an angle formed by said second lateral flange and said front side being an obtuse angle;
    a lip being attached to and extending forward of said front side adjacent to said bottom edge, said lip and said front side forms an angle between 80° and 120°;
    said panel having only a total of three boundaries attached to and extending forward of said panel for bounding the sound emitter when said sound emitter is positioned on said panel, wherein said three boundaries consist of said first lateral flange, said second lateral flange and said lip such that the sound emitter is freely movable upwardly away from said lip and over said upper edge; and
    wherein said assembly is configured to only bound the sound emitter on three sides thereof.

2. The assembly according to claim 1, wherein said panel has a length from said first edge to said second edge between 10.0 cm and 14.0 cm, said panel having a height from said upper edge to said bottom edge between 5.0 cm and 7.0 cm.

3. The assembly according to claim 1, wherein said panel has a length from said first edge to said second edge between 20.0 cm and 28.0 cm, said panel having a height from said upper edge to said bottom edge between 18.0 cm and 22.0 cm.

4. The assembly according to claim 1, further including said lip having a terminal edge positioned opposite of said panel, said lip being planar from said panel to said terminal edge.

5. The assembly according to claim 4, wherein said lip extends outwardly away from said panel a distance less than 3.0 cm.

6. The assembly according to claim 1, further including said second lateral flange having a first side abutting said front side, said first side of said second lateral flange being planar from said panel to a distal edge of said second lateral flange positioned opposite of said panel.

7. The assembly according to claim 6, wherein said first and second lateral flanges each extend away from said panel a distance less than 5.0 cm.

8. The assembly according to claim 1, further including a support being attached to said panel and retaining said panel in an angled position with respect to a support surface such that an angle formed with the support surface is an acute angle, said acute angle being between 30° and 80°.

9. The assembly according to claim 8, wherein said support comprises a plate being attached to said panel, said plate being angled downwardly from said top edge and outwardly from said back side.

10. The assembly according to claim 1, further including:
    said panel, said first lateral flange and said second lateral flange each being comprised of a translucent material; and
    a light emitter being attached to said back side, said light emitter being turned on and emitting a light to illuminate distal edges of said first and second lateral flanges with respect to said panel.

11. A sound deflection assembly configured for receiving a sound emitter and reflecting sound therefrom forward of the sound emitter, said assembly comprising:
    a panel having a front side, a back side, a first edge, a second edge, a bottom edge and an upper edge, said panel having a length from said first edge to said second edge between 5.0 cm and 28.0 cm, said panel having a height from said upper edge to said bottom edge between 5.0 cm and 28.0 cm, said panel being comprised of a translucent material;
    a lip being attached to said front side adjacent to said bottom edge and extending forward therefrom, said lip being configured to receive a personal sound emitting apparatus, said lip extending outwardly away from said panel a distance less than 3.0 cm, said lip and said front side forming an angle between 80° and 120°, said lip being comprised of a translucent material;
    a first lateral flange being attached to said first edge, said first lateral flange having a first side abutting said front side, said first lateral flange being angled forward of said front side such that an obtuse angle is formed with said front side and said first lateral flange;
    a second lateral flange being attached to said second edge, said second lateral flange having a first side abutting said front side, said second lateral flange being angled forward of said front side such that an obtuse angle is formed with said front side and said second lateral flange, said first and second lateral flanges comprising a translucent material, said first and second lateral flanges each extending away from said panel a distance less than 5.0 cm;
wherein said first and second lateral flanges are configured to deflect sound forward of said panel when the personal sound emitting apparatus is positioned on said front side;
a support being attached to said panel and retaining said panel in an angled position with respect to a support surface such that an angle formed with the support surface is an acute angle, said acute angle being between 30° and 80°, said support comprising a plate being attached to said panel, said plate being angled downwardly from said top edge and outwardly from said back side, said plate being comprised of a translucent material; and
a light emitter being attached to said back side, said light emitter being turned on and emitting a light to illuminate distal edges of said first and second lateral flanges with respect to said panel.

\* \* \* \* \*